UNITED STATES PATENT OFFICE.

NORVAL H. FINLEY, OF ROCHESTER, PENNSYLVANIA, ASSIGNOR OF SEVEN-EIGHTHS TO NINIAN I. SHUGERT, JOSEPH W. LATSHAW, AND HENRY C. FRY, ALL OF SAME PLACE.

DRYING-OIL AND METHOD OF MAKING THE SAME.

SPECIFICATION forming part of Letters Patent No. 456,890, dated July 28, 1891.

Application filed October 18, 1889. Serial No. 327,454. (No specimens.)

*To all whom it may concern:*

Be it known that I, NORVAL H. FINLEY, of Rochester, in the county of Beaver and State of Pennsylvania, have invented a new and useful Improvement in Drying-Oils and Methods of Making the Same, of which the following is a full, clear, and exact description.

The object of my invention is to provide an oil compound which may be used with advantage in the arts as a substitute for linseed-oil, its chief use being in the mixing of paints, the considerable cost of linseed-oil making it in many cases undesirable.

My improved oil posseses to a high degree the property of drying or setting, which is characteristic of linseed-oil, and which constitutes for this use its principal advantage.

I shall now describe the method which I use in preparing such compound, so that others skilled in the art to which it appertains may successfully practice the same.

The ingredients of the compound and the proportions which I have found desirable are about as follows: oxide of lead, (litharge,) two ounces; shellac, (preferably bleached,) one ounce; resin, two ounces; fish-oil, one pint; linseed-oil, one pint; turpentine, half pint; benzine, five and one-half pints. Of these ingredients the proportions may be varied somewhat, and, if desired, either the turpentine or benzine may be omitted, the other being used as a substitute, though each has its individual function, and for many reasons both are desirable. Either the shellac or resin may also be omitted, the other being used alone in quantity equal to the sum of both.

The following is the method which I prefer to employ in compounding the oil: I place the fish-oil in a vat or vessel and add to it ordinary commercial sulphuric acid and agitate the oil with the acid until the albuminous substance of the oil is coagulated. This step of the process is continued until the settling of the albumen and other impurities and the improved appearance of the oil indicates its thorough clarification. The linseed-oil is also treated in a separate vat in a similar manner. For the fish-oil about four per centum of acid is used and for the linseed-oil about two per centum. Water (preferably rain-water) is then introduced into the vat and agitated with the oils, so as to dissolve the acid, and then is allowed to settle with the impurities into drums or cavities at the bases of the vats. The clarified linseed-oil and fish-oil are then drawn off to a suitable heating-tank, which is open, so as to expose its contents to the atmosphere. In this tank the oils are boiled at a temperature of about 226° Fahrenheit, either by the application of fire to the tank or by contained steam-pipes. In this tank the litharge, shellac, and resin are added to the oils and agitated therewith, and the boiling is continued for about one or two hours. The litharge has the effect of oxidizing the oil, and thus improving its drying qualities, while the shellac and resin thicken it, give it body, and also make it better qualified to set or dry when used in paints. At the end of this boiling process the temperature is lowered to about 175°, and at this temperature the oils are maintained for a considerable time—say about twenty-four hours—during which time the oils take up oxygen from the air and become oxidized, and the litharge, having performed its work in the oil, settles to the bottom. The compound is then removed to a mixing-tank containing a steam-coil or provided with other means of heating. In this tank I add the benzine while the compound is at about a temperature of 70° Fahrenheit. The temperature is then raised to about 100° Fahrenheit, and is held at this point about twenty-four hours. I then add the turpentine and allow the compound to stand at the same temperature for about six hours. The compound is then drawn off through a filter or filters of the usual sort, which remove the impurities and make it clear and transparent. It is then ready for use.

The advantages of my improved compound will be manifest on its use. It is clear in color, contains no sedimentary impurities, it is a good drying-oil, and may be used with advantage as a substitute for linseed-oil in mixing paints.

The method of manufacture of the compound may be varied in divers way. I have stated the manner of compounding and the periods of duration of the steps which I have found preferable; but it will be understood that the operation may be lengthened or shortened in time and the proportions of the ingredients may be varied. The function of the turpentine in the compound is to give it body and an agreeable odor and to make it dry easily. The function of the benzine is also to improve its drying qualities.

I claim—

1. The oil compound consisting of a resinous substance, clarified fish-oil, and linseed-oil, benzine, and turpentine, substantially as and for the purposes described.

2. The method of making an oil compound, which consists in washing oils with acid, heating them, oxidizing them with litharge, adding resinous substance thereto, and then mixing the same at a lower temperature with a drier, substantially as and for the purposes described.

3. The method of making an oil compound, which consists in washing oils with acid, heating them, oxidizing them with litharge, adding resinous substance thereto, maintaining them for a considerable time in a heated condition in a vessel exposed to the atmosphere, and then mixing the same with a drier, substantially as and for the purposes described.

4. The method of making an oil compound, which consists in washing oils with acid, heating them, oxidizing them with litharge, adding resinous substance thereto, then mixing the same at a lower temperature with a drier, and maintaining them for a considerable time in a heated condition, substantially as and for the purposes described.

5. The method of making an oil compound, which consists in washing oils with acid, heating them, oxidizing them with litharge, adding resinous substance thereto, then mixing the same with a drier, and filtering, substantially as and for the purposes described.

In testimony whereof I have hereunto set my hand this 15th day of October, A.D. 1889.

NORVAL H. FINLEY.

Witnesses:
 THOMAS W. BAKEWELL,
 N. I. SHUGERT.